UNITED STATES PATENT OFFICE.

HOWARD F. CHAPPELL, OF NEW YORK, N. Y., ASSIGNOR TO MINERAL PRODUCTS CORPORATION, OF NEW YORK, N. Y., A CORPORATION OF MAINE.

TREATMENT OF INSOLUBLE ALUMINA.

1,270,266.   Specification of Letters Patent.   Patented June 25, 1918.

No Drawing.   Application filed March 1, 1916.   Serial No. 81,357.

*To all whom it may concern:*

Be it known that I, HOWARD F. CHAPPELL, a citizen of the United States, residing in the borough of Manhattan, city, county, and State of New York, have invented certain new and useful Improvements in the Treatment of Insoluble Alumina; and I do hereby declare the following to be a full, clear, and exact description of the invention, such as will enable others skilled in the art to which it appertains to make and use the same.

This invention relates to the conversion of the alkali-insoluble alumina of calcined alunite into a soluble form.

When alunite is calcined according to the method described in the MacDowell Patent No. 1,136,549, granted April 20, 1915, or the method described in my prior Patent No. 1,070,324 granted August 12, 1913, the alumina is converted into an alkali-insoluble form, and it is difficult to purify this alumina by the usual methods.

The present invention is based upon the discovery that such insoluble alumina, after it has been freed from soluble potassium compounds, can be converted into a soluble form by fixing and roasting with sodium carbonate, or with sodium carbonate and lime, or with other alkalis.

A preferred method of carrying out the process of the invention is the following:

100 parts of the wet filter cake, obtained by filtering and washing the calcined alunite described in my prior Patent No. 1,070,324, and containing about 40% moisture, is thoroughly mixed with about 210 parts of sodium carbonate, either as a dry salt or in the form of a solution, and with 110 parts of lime as calcium oxid. This mixture is dried and calcined at about 900° C. for about two hours. After the calcination, the resulting soluble aluminum compounds can be extracted in any suitable manner, as by digestion with water.

In this manner, practically all of the alumina can be dissolved as aluminate, and subsequently recovered from the solution in a comparatively pure form by precipitation, for example, with carbon dioxid. The caustic soda or carbonate obtained from the precipitation of the alumina can be used over again for mixing with further charges of the filter cake, in the manner above described.

What I claim is:

1. The method of converting the alkali-insoluble alumina of calcined alunite into water-soluble compounds, which comprises washing and filtering the calcined alunite to remove soluble potassium compounds, mixing the filter cake with an alkali and an alkali earth, calcining the mixture at about 900° C., and recovering the water-soluble compounds from the calcine; substantially as described.

2. The method of converting the alkali-insoluble alumina of calcined alunite into water-soluble compounds, which comprises calcining the alumina with alkali and alkali earth, and recovering the water-soluble compounds from the calcine; substantially as described.

3. The method of converting the alkali-insoluble alumina of calcined alunite into water-soluble compounds, which comprises calcining the alumina with sodium carbonate and calcium oxid, and recovering the soluble compounds from the calcine; substantially as described.

4. The method of converting the alkali-insoluble alumina of calcined alunite into water-soluble compounds, which comprises washing and filtering the calcined alunite, mixing about 100 parts of the filter cake with about 210 parts of sodium carbonate and about 110 parts of calcium oxid, calcining the mixture at about 900° C., and recovering the water-soluble compounds from the calcine; substantially as described.

5. The method of converting the alkali-insoluble alumina of calcined alunite into water-soluble compounds, which comprises mixing the alumina with an alkali carbonate and an alkali earth oxid and calcining the mixture, and recovering the water-soluble compounds from the calcine; substantially as described.

In testimony whereof I affix my signature.

HOWARD F. CHAPPELL.

It is hereby certified that in Letters Patent No. 1,270,266, granted June 25, 1918, upon the application of Howard F. Chappell, of New York, N. Y., for an improvement in "Treatment of Insoluble Alumina," an error appears in the printed specification requiring correction as follows: Line 27, for the word "fixing" read *mixing*; and that the said Letters Patent should be read with this correction therein that the same may conform to the record of the case in the Patent Office.

Signed and sealed this 23d day of July, A. D., 1918.

[SEAL.]

R. F. WHITEHEAD,
*Acting Commissioner of Patents.*

Cl. 23—13.